United States Patent
Arlot et al.

(10) Patent No.: US 9,276,454 B2
(45) Date of Patent: Mar. 1, 2016

(54) ELECTROMAGNETIC ACTUATOR HAVING IMPROVED FORCE DENSITY AND USE THEREOF FOR AN ELECTRIC RAZOR

(75) Inventors: Richard Arlot, Bonnevent Velloreille (FR); Guillaume Loussert, Besancon (FR)

(73) Assignee: MOVING MAGNET TECHNOLOGIES (MMT), Besançon (FR)

( * ) Notice: Subject to any disclaimer, the term of this patent is extended or adjusted under 35 U.S.C. 154(b) by 292 days.

(21) Appl. No.: 14/000,069

(22) PCT Filed: Feb. 22, 2012

(86) PCT No.: PCT/FR2012/050373
§ 371 (c)(1),
(2), (4) Date: Feb. 19, 2014

(87) PCT Pub. No.: WO2012/114042
PCT Pub. Date: Aug. 30, 2012

(65) Prior Publication Data
US 2014/0150265 A1  Jun. 5, 2014

(30) Foreign Application Priority Data

Feb. 23, 2011 (FR) ..................................... 11 00541

(51) Int. Cl.
*H02K 33/18* (2006.01)
*H02K 35/02* (2006.01)
(Continued)

(52) U.S. Cl.
CPC ............ *H02K 33/18* (2013.01); *B26B 19/3873* (2013.01); *H02K 7/065* (2013.01); *H02K 33/16* (2013.01); *H02K 35/02* (2013.01)

(58) Field of Classification Search
CPC ....... H02K 33/18; H02K 7/065; H02K 35/02; H02K 33/16; B26B 19/3873

USPC ......................................... 310/12, 51, 156, 42
See application file for complete search history.

(56) References Cited

U.S. PATENT DOCUMENTS

| 4,994,698 | A | * | 2/1991 | Kliman | ................... H02K 7/065 310/326 |
| 5,444,313 | A | | 8/1995 | Oudet | |

(Continued)

FOREIGN PATENT DOCUMENTS

| WO | WO-0058976 A1 | 10/2000 |
| WO | WO-2004/028759 A1 | 4/2004 |
| WO | WO-2009/119450 A1 | 10/2009 |

OTHER PUBLICATIONS

Optimization Process for Winding Stators. © 1983. Published online 1994. Alliance Winding Inc. Copied from http://www.alliance-winding.com/techpapers/optprocess.pdf (Available Online).*

(Continued)

*Primary Examiner* — Sean Michalski
(74) *Attorney, Agent, or Firm* — Harness, Dickey & Pierce, P.L.C.

(57) ABSTRACT

An electromagnetic actuator includes a stator unit having N poles having the width LP, and at least one coil surrounding one of the poles, wherein N≤3, and a magnetic portion, which is movable, relative to the stator unit, in a direction of relative movement and over a course of travel C, and including N+1 magnetized areas, the magnetizations of which are perpendicular to the relative movement direction and in alternate directions. The magnetic portion includes a yoke for closing off the magnetic fluxes passing through the magnetized areas, the course of travel C of the magnetic portion being less than or equal to the width LP of each pole, and the thickness of the magnetized areas perpendicular to the direction of movement being less than the course of travel C of the magnetic portion.

17 Claims, 4 Drawing Sheets

(51) Int. Cl.
  *H02K 7/065* (2006.01)
  *H02K 33/16* (2006.01)
  *B26B 19/38* (2006.01)

(56) References Cited

U.S. PATENT DOCUMENTS

| | | | | |
|---|---|---|---|---|
| 5,559,378 | A | 9/1996 | Oudet et al. | |
| 6,005,462 | A * | 12/1999 | Myers | H02K 33/18 335/220 |
| 6,236,125 | B1 * | 5/2001 | Oudet | H02K 33/16 310/12.02 |
| 6,249,065 | B1 * | 6/2001 | Oudet | H02K 33/16 310/12.19 |
| 7,589,445 | B2 | 9/2009 | Gandel et al. | |
| 7,898,122 | B2 | 3/2011 | Andrieux et al. | |
| 8,112,892 | B2 | 2/2012 | Haczek et al. | |
| 8,464,429 | B2 | 6/2013 | Haczek et al. | |
| 2002/0055695 | A1 * | 5/2002 | Takahata | B26B 19/282 601/89 |
| 2004/0061384 | A1 * | 4/2004 | Yatsuzuka | H02K 33/16 310/13 |
| 2006/0250043 | A1 * | 11/2006 | Chung | H02K 5/08 310/216.004 |
| 2006/0273674 | A1 * | 12/2006 | Aiello | F16C 25/045 310/90 |
| 2007/0176504 | A1 * | 8/2007 | Otsuki | F16C 17/08 310/90.5 |
| 2008/0284261 | A1 * | 11/2008 | Andrieux | F01L 9/04 310/30 |
| 2011/0203061 | A1 * | 8/2011 | Takahashi | A61C 17/32 15/22.1 |
| 2012/0112565 | A1 * | 5/2012 | Lee | H02K 33/16 310/20 |
| 2013/0342035 | A1 * | 12/2013 | Kim | B06B 1/045 310/25 |
| 2014/0001889 | A1 * | 1/2014 | Hong | H02K 33/18 310/25 |
| 2014/0152126 | A1 * | 6/2014 | Kim | B06B 1/045 310/25 |

OTHER PUBLICATIONS

English Translation of the International Preliminary Report on Patentability, IB, Geneva, issued Aug. 27, 2013, incorporating the English Translation of the Written Opinion of the ISA, ISA/EP, Rijswijk, NL, mailed May 2, 2013.

* cited by examiner

ELECTROMAGNETIC ACTUATOR HAVING IMPROVED FORCE DENSITY AND USE THEREOF FOR AN ELECTRIC RAZOR

CROSS-REFERENCE TO RELATED APPLICATIONS

This application is a National Phase Entry of International Application No. PCT/FR2012/050373, filed on Feb. 22, 2012, which claims priority to French patent application Ser. No. 11/00541, filed on Feb. 22, 2011, both of which are incorporated by reference herein.

TECHNICAL FIELD

Generally speaking, the invention relates to the field of electromagnetic actuators with a limited course of travel, comprising permanent magnets. More particularly, the invention relates to a electromagnetic actuator including at least a stator unit and a magnetic portion, with the stator unit having N poles having the same width LP, and at least one coil surrounding one of said poles, wherein N≥3, and the magnetic portion being movable, relative to the stator unit, in a direction of relative movement and over a course of travel C, and including N+1 magnetized areas, the magnetizations of which are perpendicular to the direction of relative movement and in alternate directions, with said direction of movement corresponding to the direction wherein the poles of the stator unit and the magnetized areas of the magnetic portion are aligned.

BACKGROUND AND SUMMARY

An actuator of this type is, for example, known from the international patent application WO 2009/119450. Such an actuator makes it possible to produce an electromagnetic device which can be used when positioned against a spring or with a reciprocating movement in an oscillating and vibrating mechanical system. Various devices are known in the state of the art, which aim at solving the general problem of the force linearity they exert as a function of the current supply they receive, and at developing force levels which are sufficient for numerous applications. The documents EP0592647 and EP1005714, which belong to the Applicant, refer to electromagnetic actuators developing an effort proportional to the current through the mutual action of the magnetic fields created by the permanent magnets they contain and the feed electric coil.

Such electromagnetic devices are particularly interesting when they are used in oscillating systems, when combined with resilient return members, where the proportional characteristic thereof and the strong force density thereof make it possible to check heavy loads, whether of a dry or viscous nature. Such devices comprise two identical movable portions moving in phase inversion, cancelling the total movement amplitude, and thus guaranteeing an optimum balance of the actuator. They are more particularly used for vibrating contra-rotating mechanical members such as, for instance, the blades of an electric razor.

This solution has a drawback in that the force density enabling a satisfactory operation requires a structure with large dimensions. When the geometric dimensions are reduced into a compact configuration, and more particularly the thickness of the structure, this results in situations wherein the force density is insufficient. A first problem that the invention aims at remedying is that of the reduction in overall dimensions, in order to enable the production of very compact actuators, without affecting the performances thereof.

Such devices of the prior art may be inefficient when the need for a significant miniaturization of the actuator exists. The devices of patents EP0592647 and EP1005714 thus develop too low force factors (force per ampere-turn), which makes the utilization thereof non viable with small dimensions, since heating is too important. As a matter of fact, the reduction in overall dimensions leads to a reduction in the volume reserved for the electric coil. A more important electric power will thus be necessary for producing the same force. Such more important electric power will result in too high current consumption, thus limiting the service life, with an equivalent battery, when the system is aboard, and will result in a higher Joule dissipation. This may lead to too high a heating of the device causing some inconvenience for the user in the case of a portable application such as an electric razor, or to the destruction of the actuator.

The international patent application WO 2009/119450 mentioned above takes up the utilization of such electromagnetic structures by recommending the elimination of the ferromagnetic yoke, with a view to favouring construction simplicity. In the structure known from such application WO 2009/119450, the reduction in the movable ferromagnetic portion certainly makes the construction easier with fewer parts, but it also requires a much larger magnet volume, which finally results in higher cost, larger movable mass and global dimensions. The second technical issue that the invention tries to remedy consists in reducing the required magnet volume, which turned out to be possible only when implementing a solution against the teachings of the above-mentioned prior art.

The present invention aims at remedying the drawbacks of the prior art by producing an electromagnetic actuating device having a higher force density than the devices of the prior art. The invention more particularly enables the utilization of an efficient actuator in a reduced volume, relative to the devices of the prior art. For this purpose, the present invention, which is moreover complying with the generic definition given in the preamble above, is mainly characterized in that the magnetic portion further comprises a yoke contiguous to the magnetized areas and closing off the magnetic fluxes passing through the magnetized areas, in that the course of travel C of the magnetic portion is less than or equal to the width LP of each pole of the stator unit, and in that the thickness of the magnetized areas perpendicular to the direction of movement is less than the course of travel C of the magnetic portion. In the meaning used herein, the word "course" means the maximum distance between two extreme positions taken by the magnetic portion relative to the stator unit.

In the state of the art, U.S. patent application publication No. 2002/0055695 is known, which discloses an actuator having a stator comprising a first set of poles and a second set of poles distributed on each side of an electric coil positioned about a central element. The number of poles of the stator on each side of the coil is the same. When the coil is powered, there are as many South poles as North poles in the stator.

In this solution of the prior art, the electric coil does not surround a pole but a central portion separating the North poles from the South poles. The stator disclosed requires a particular design, as illustrated in FIGS. 3a and 3b, with an alternating set of packaged sheets which make up together an elementary pattern. This entails a high production cost of the stator. The movable element composed of magnets, moves in the air gap existing between two opposite poles of the stator and has no yoke closing off the magnetic flux. FIGS. 9 and 10 of this document of the prior art show twice as many poles of the stator as magnetized poles (with each "tooth" of the stator representing a pole).

Patent DE102005044176 is also known in the prior art, which discloses an actuator with a two-pole stator. In this solution, each termination of the two poles of the core faces a magnet transition, i.e. an area separating a North-permed pole and a South-permed pole. When the stator moves relative to the coiled core, each pole termination faces a North pole (if the stator moves to the right) or a South pole (if the stator moves to the right).

Thus, in theory, the flux produced by the magnets and passing through the coils is null, whatever the position. This results in an actuator which cannot produce an effort with a current. In order to make an effort with a current, when the stator moves relative to the magnetized portions, each pole must face a different magnet polarity in order to provide a variation in the magnetic flux in the coil, and this flux variation will create the electromagnetic force.

Patent EP1005714 is also known in the prior art, which discloses a magnetic actuator the basic pattern of which is identical and which is composed of a two-pole stator and one or two movable portion(s) having 3 alternate magnets. The invention provides for the modification of the magnetic structure of the actuator disclosed in patent EP1005714 by increasing the force factor thereof in the same volume, without modifying the intrinsic characteristics thereof which are the coil volume and permeance. It is thus possible to produce, according to the invention, an actuator the volume of which is substantially less than the volume which would be required by an actuator produced according to the teachings of the patent EP1005714 to develop a force having the same intensity.

Adding a mild ferromagnetic yoke makes it possible, contrary to the teachings of the prior art WO 2009/119450, to substantially increase the performances of the actuator by efficiently closing off again the magnetic flux and by limiting the loss of magnetic potential. Limiting the course of travel C to a value less than or equal to the width of a pole belonging to the stator unit makes it possible to keep an optimum ratio of force to magnet mass and to keep a quasi-linear force characteristic along the course of travel. Limiting the thickness of the magnetized areas to a value less than the course of travel C of the magnetic portion, which is, for instance, made possible by using high energy magnets of the NdFeB or SmCo types, makes it possible to obtain a force density per actuator volume and per magnet mass which is higher than those of the structures of the prior art.

In the actuator of the invention, N is for instance 3, and such actuator preferably includes a single coil surrounding the central pole of the stator unit. The magnetized areas advantageously comprise at least two inner magnetized areas having, along the direction of movement, a length LA2 equal to the distance between the respective median planes of two consecutive stator poles, with such median planes extending perpendicularly to the direction of movement. Besides, the magnetized areas comprise at least two end magnetized areas preferably having, along the direction of movement, a length LA1 between LP and 1.2×LP.

According to a first possible embodiment, the magnetized areas are formed by independent and contiguous magnets fixed on the yoke. According to another possible embodiment, the magnetized areas are formed by a single magnet, having magnetized areas alternately magnetized in opposite directions and transitions having a length less than 0.2×LP. As a matter of fact, when the magnetic transition between two magnetized areas is above such factor, the loss of force becomes significant for the same magnet mass.

According to an alternative solution, the actuator comprises two movable magnetic portions moving in opposite directions, which makes it possible to make up for the movement amplitude of the two portions. According to another alternative solution, the actuator comprises three movable magnetic portions moving in alternate directions, which makes it possible to make up for the movement amplitude and the kinetic movement of the three portions.

The stator unit is advantageously connected to each magnetic portion by suspension blades. According to a particular alternative solution, the stator unit is connected to each magnetic portion by resilient return elements so designed as to return such magnetic portion to the middle of the course of travel thereof. The coil is advantageously so designed as to be powered by alternate current and to produce a vibratory movement of the magnetic portion relative to the stator unit.

According to a possible embodiment, the surfaces of the stator poles are, for instance, inscribed within a cylindrical enclosure with the magnetic portion(s) having a semi-tubular shape cooperating with the cylindrical enclosure. In addition, the yoke has chamfers at the ends thereof, along the direction of movement. It may also be advantageous to provide for each pole of the stator unit to have a head having a width LP and a body having a width less than LP.

In some applications, the actuator of the invention can further comprise a magnetic sensor and an electronic control circuit, with the magnetic sensor being positioned opposite the magnetic portion and so designed as to provide an output signal representative of the absolute position of such magnetic portion, and the electronic control circuit receiving the output signal from the magnetic sensor and being so designed as to control the position of the magnetic portion in a position determined by a set value powered to such electronic control circuit. The invention further relates to the use of an actuator such as described here-above for an electric razor comprising a head provided with vibrating knives, characterized in that each one of the knives is kinematically linked with the magnetic portion of such an actuator.

Adding two end magnets to the magnets of the magnetic device as disclosed in document EP1005714 makes it possible to create a force factor higher by a 4/3 factor, i.e. a 33% increase for the same current, the same coil, the same electric power and the same volume of the actuator. As a matter of fact, when N=3 and when one and only one coil is positioned on the central pole of the stator unit, the value of the theoretical force F produced by the actuator, equal to the product of the force factor by the number of ampere-turn of the coil, executed for instance using an equivalent electric diagram, is given by the following relation:

$$F = \frac{8B_r LZ}{3E} ni$$

where Br is the magnet remanence, L the thickness thereof in the direction of the magnetization thereof, Z the depth thereof, E the air gap including the magnet, and ni the number of ampere-turn of the coil.

In the actuators of the state of the art, having a yoke, as mentioned above and including a single coil, as disclosed in documents EP1005714 and EP0592647, the factor applied to the quantity $$\frac{B_r LZ}{E} ni$$

is not 8/3 but 2.

BRIEF DESCRIPTION OF THE DRAWINGS

Other characteristics and advantages of the invention will be more clearly understood when reading the following description of various detailed embodiments, which are given as indicating but non limiting examples while referring to the drawings appended here, wherein.

DETAILED DESCRIPTION

Figure 1:
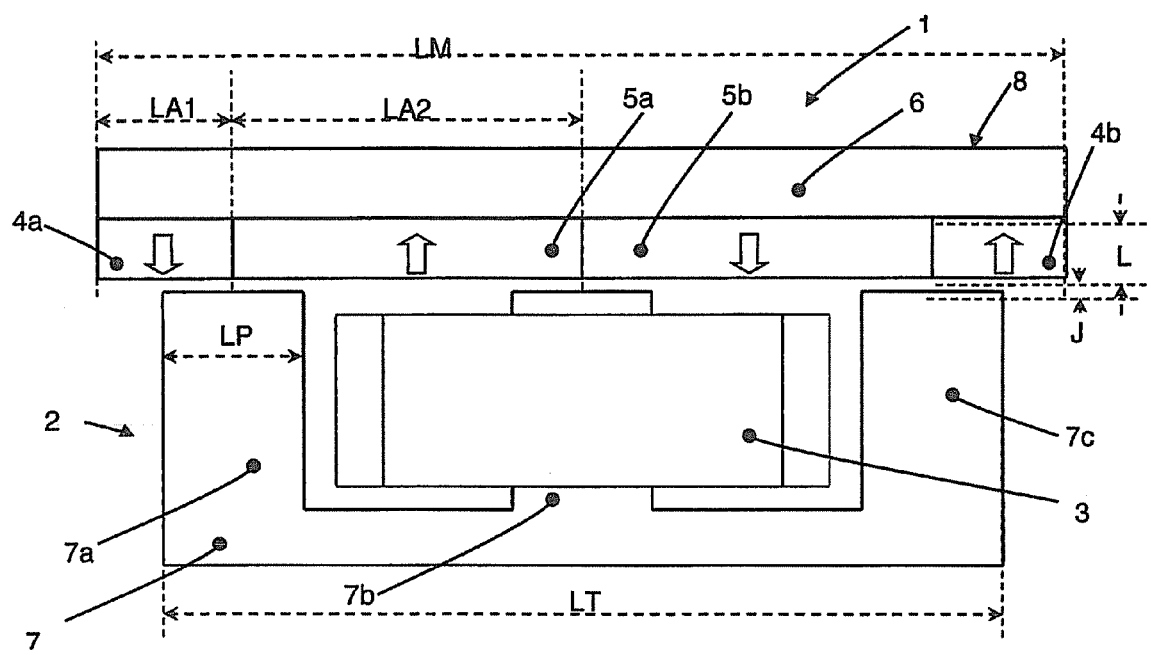
FIG. 1 is a front view of an actuator according to a first embodiment.

FIG. 1 shows a front face of an actuator 1 according to the first embodiment of the invention. The actuator comprises a stator unit 2 substantially formed, on the one hand, by a stator 7 made of a mild ferromagnetic material having three poles 7a, 7b and 7c, each extending along the axial direction, oriented vertically in FIG. 1 and contained within the plane of the figure, and, on the other hand, an electric coil 3 surrounding the central pole 7b. The poles 7a, 7b and 7c have all the same width, having the value LP, with such width being measured along a longitudinal direction, oriented horizontally in FIG. 1 and contained within the plane of this figure, i.e. in the direction of the alignment of the poles and perpendicularly to the axial direction.

The actuator also comprises a magnetic portion 8 positioned parallel to the stator unit 2, facing poles 7a, 7b and 7c, from which it is parted by a mechanical clearance J. Such magnetic portion 8 is selectively moved relative to the stator unit 2 by a relative course of travel C and oriented along the longitudinal direction, i.e. horizontally within the plane of FIG. 1. The stator has one and only one profile enabling the stacking of identical sheets.

Such magnetic portion 8 comprises a yoke 6 made of a mild ferromagnetic material, whereon four magnets, i.e. two identical end magnets 4a and 4b and two identical inner magnets 5a and 5b are positioned. The end magnets 4a and 4b have the same length having a value LA1, with such length being measured along the longitudinal direction, i.e. horizontally within the plane of FIG. 1. Similarly, the inner magnets 5a and 5b have the same length having a value LA2, with such length being measured along the longitudinal direction too.

The stator has N poles and at least one coil surrounding one of said poles. When N=3, as illustrated in the appended Figures, there is only one North (or South) pole for two South (respectively North) poles, when the coil is powered.

The four magnets 4a, 4b, 5a and 5b have the same thickness, having a value L, with such thickness being measured in the axial direction, i.e. vertically within the plane of FIG. 1. The thickness L of the poles is less than the course of travel C of the magnetic portion 8 and the width of the poles LP. In addition, such magnets are all magnetized in the axial direction. The wide white arrow on each magnet 4a, 4b, 5a and 5b illustrated in FIG. 1 shows the axial direction and the direction of the magnetization or the polarization of such magnet. The magnets 4a, 4b, 5a and 5b must thus be so magnetized that two contiguous magnets have opposite polarities. Thus, in FIG. 1, the magnet 4a and the magnet 5b have a polarization oriented to the stator unit 2, whereas the magnets 4b and 5a have a polarisation oriented opposite the stator unit 2.

The magnets are integral with a yoke so that the magnetic flux goes through only two thicknesses of air (air gap), which makes it possible to reduce the loss of magnetic potential and to avoid the degradation of the performances of the actuator relative to solutions of the prior art. When the stator 2 moves relative to the magnetized portions 8, each pole consecutive to the stator faces a different polarity. This makes it possible to ensure that the magnetic flux produced by the magnets and passing through the coils varies according to the position, thus ensuring a non null force with a current.

The course of travel C, i.e. the total motion space of the magnetic portion 8 according to the longitudinal direction, is limited to a maximum of the width P of the poles 7a, 7b and 7c of the stator 7. In the position in the middle of the course of travel of the magnetic portion 8, the transitions of the magnets, i.e. the boundaries between the magnets 4a and 5a, and between the magnets 5b and 4b, extend parallel to the axial direction of the poles 7a, 7b and 7c, i.e. vertically, and are positioned in the middle of such poles, i.e. at mid-width LP. In FIG. 1, the magnetic portion 8 is thus shown exactly in the middle of the course of travel C thereof, with such course of travel being at most equal to LP.

The end magnets 4a and 4b have a length LA1 at least equal to the width LP of the poles 7a, 7b and 7c. As a consequence, the total length LM of the magnetic portion 8 is at least equal to the total length LT of the stator unit 2, increased by the width LP of one pole, which can be written as: LM≥LT+LP.

In order to limit the total movable mass, the length of the yoke 6 supporting the magnets 4a, 4b, 5a and 5b is advantageously equal to the sum of the lengths of the magnets, as shown in FIG. 1. For reasons of outer mechanical behaviour, increasing the length of the yoke 6 can however be considered in order to enable the mechanical fixing of a suspension or an outer member to be moved.

Figure 2:
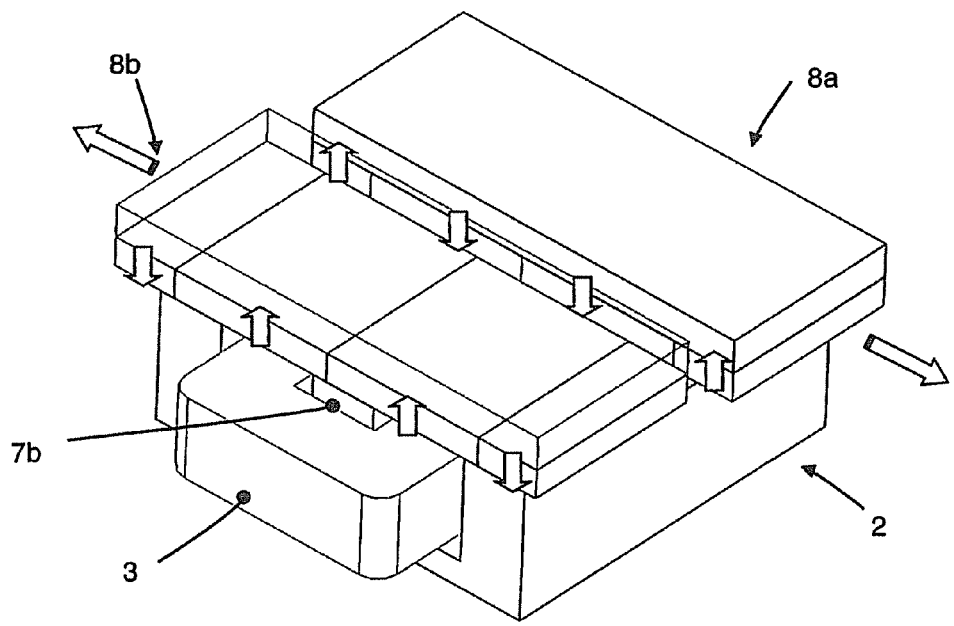
FIG. 2 is a three-quarter view of an actuator according to a second embodiment.

FIG. 2 shows an embodiment of the actuator which uses two movable magnetic portions moving in phase inversion, with such an actuator being used, for instance, for actuating the blades of an electric razor. Although it relates to an embodiment possibly different from the one illustrated in FIG. 1, such perspective view makes it possible to understand that all the elements shown in FIG. 1 also extend in depth along a direction perpendicular to the plane of FIG. 1. The actuator 1 shown in FIG. 2 comprises two independent and distinct magnetic portions 8a and 8b which are each provided with magnets, as mentioned above. Each one of the magnets in the magnetic portion 8a has a polarity opposite that of the magnet of the magnetic portion 8b in a matching position, so that, when a magnetic flux is produced by the single electric coil 3 surrounding the central pole 7b of the stator unit 2, the two magnetic portions 8a and 8b move in opposite directions. The movement of the two magnetic portions 8a and 8b is thus in phase inversion, when varying the period and the (positive and negative) polarity of the current. The right striped arrows show the direction of the force and the motion for an arbitrary current passing through the coil.

In one possible and realistic embodiment, the various construction parameters may take the following values, expressed in millimeters: LM=22 LA1=3.6 LA2=7.4 LP=3.2 LT=18 L=1.4 J=0.25 C=3.

Figure 3:
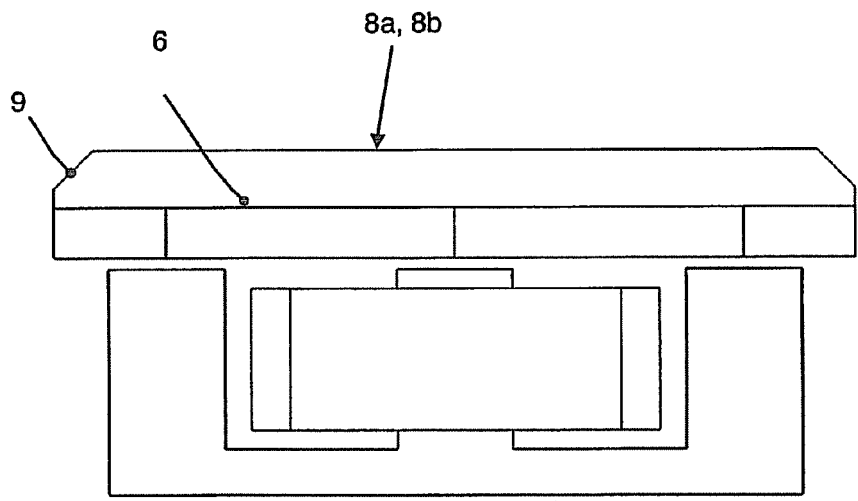
FIG. 3 is a face view of an actuator according to an alternative solution of the first embodiment.

As illustrated in FIG. 3, the ends of the yokes 6 of the magnetic portion(s) 8a and 8b can be chamfered 9 in order to make the movable mass lighter. As a matter of fact, such chamfers 9 are provided in areas which are not magnetically useful, since the magnetic flux does not pass through these ends. The lightening of the movable masses more particularly makes it possible, in addition to saving material and costs, to reduce, for a given frequency, the stiffness required for the resilient return members, or elements generally associated with such magnetic portions 8a and 8b.

Figure 4:
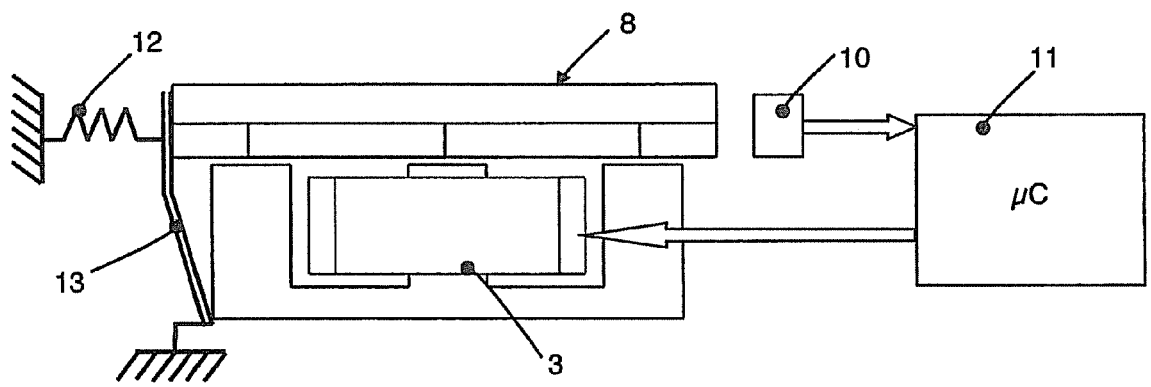
FIG. 4 is a schematic diagram showing the operation of an actuator according to an embodiment including a control loop provided with a sensor.

FIG. 4 is a schematic diagram illustrating the operation of an actuator equipped with a control loop. In this loop, an optionally but preferably magnetic position sensor 10 detects the relative motion of the magnetic portion 8 relative to the stator unit 2 and sends to an electronic control circuit 11 an output signal representing the position of this magnetic portion 8. The electronic control circuit 11, which is for instance substantially composed of a microcontroller and which has a set value used as an instant or an average reference, can thus regulate the current in the coil 3, so that the magnetic portion 8 takes an instant or average position which depends on the set value. Advantageously, but not limitatively, the magnetic portion 8 which is movable relative to the stator unit 2, is connected to such stator unit 2 by means of suspension blades 13 which can ensure the relative positioning of the magnetic portion 8 relative to the stator unit 2, and also connected to a resilient return element 12.

Figure 5:
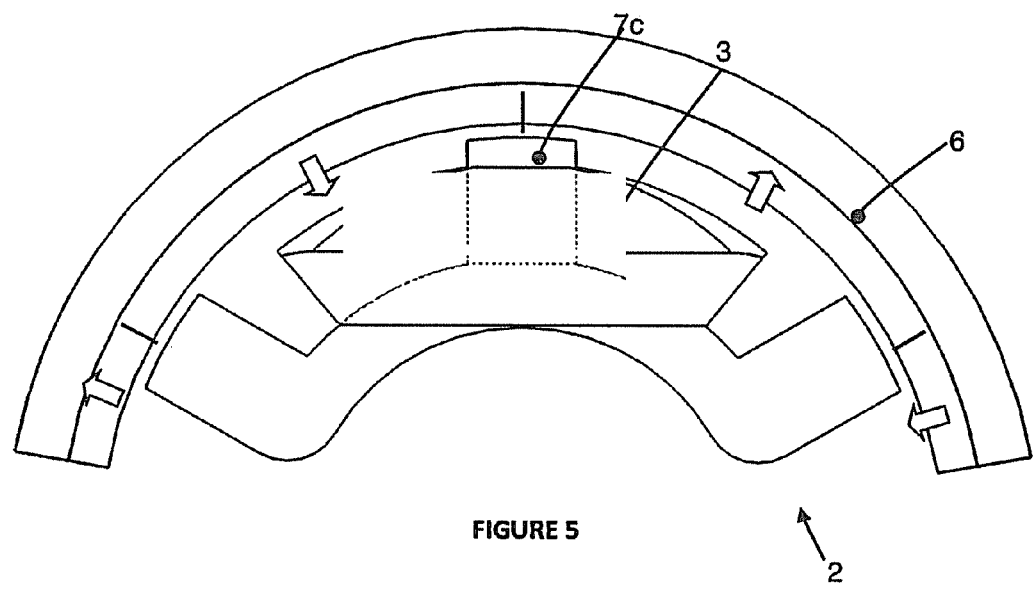
FIG. 5 is a front view of an actuator according to a third embodiment.

FIG. 5 shows a third possible embodiment of the actuator, wherein the magnetic portion makes a rotation and no longer a simple translation. The actuator of FIG. 5 however comprises the same elements as the actuators already disclosed above, i.e. for N=3: a stator unit 2 composed of three poles and the central pole 7c of which carries a coil 3, and a magnetic portion composed of a yoke 6 carrying four magnets having alternate polarizations and a uni-directional magnetization direction, i.e. a radial direction. On the contrary, in this embodiment, the surfaces of the stator poles are inscribed within a cylindrical enclosure and the magnetic portion(s) has/have a semi-tubular shape cooperating with said cylindrical enclosure.

Figure 6:
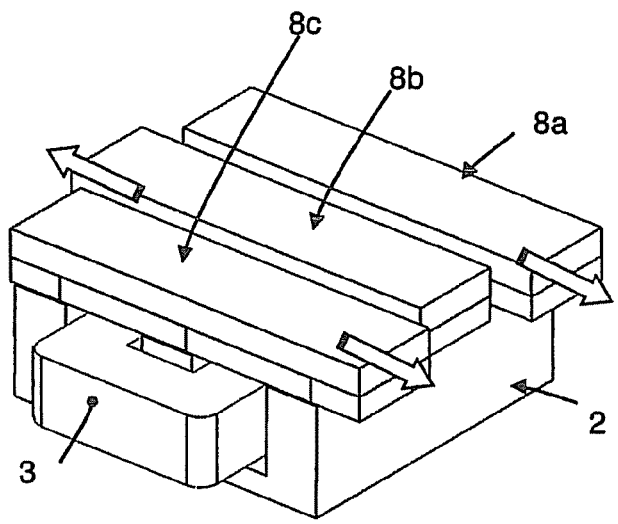
FIG. 6 is a three-quarter view of an actuator according to a fourth embodiment.

FIG. 6 shows a fourth possible embodiment of the actuator, wherein such actuator includes three movable magnetic portions 8a, 8b, 8c relative to the stator unit 2, which is then common to such three magnetic portions. The two outer movable magnetic portions 8a, 8c are preferably identical and thus the end magnets and the inner magnets thereof have the same magnetization. Such magnetic portions 8a, 8c thus have the same movement when an electric current passes through the coil 3. The third magnetic portion 8b, which is positioned between the first two 8a, 8c, includes magnets, the polarization of which is opposite that of the first two magnetic portions 8a, 8c. This central magnetic portion 8b thus moves in the direction opposite that of the other two magnetic portions 8a, 8c when the same current passes through the coil 3. The right striped arrows give an example of the direction of the force applied to each one of the movable magnetic portions 8a, 8b, 8c relative to the stator unit 2, and thus the corresponding direction of movement.

The embodiment shown in FIG. 6 has the advantage of enabling a complete compensation of the total kinetic moment of the movable magnetic portions 8a, 8b, 8c. Improved user comfort results therefrom when the invention concerns a portable application, for example, when the movable magnetic portions 8a, 8b, 8c are used for moving the blades of a razor. For this purpose, the mobile mass of the central movable magnetic portion 8b is made equivalent to the total mass of the two other movable magnetic portions 8a, and 8c.

Figure 7:
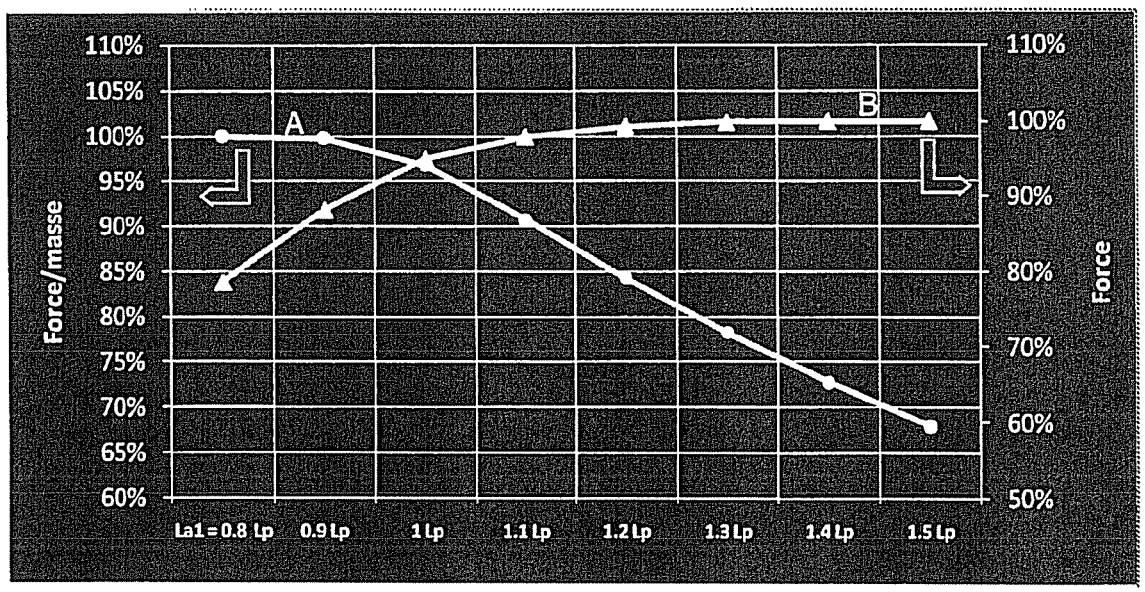
FIG. 7 is a diagram showing the evolution of significant operation parameters of an actuator according to the invention, with the parameters $L_P$ and La1 shown in this diagram being the same as LP and LA1 mentioned in the present description.

FIG. 7 shows the typical evolution of the force and the ratio of force to the magnet mass as a function of the length LA1 of the end magnets. The solid line curve A and round marks thus show the evolution of the ratio of force to the magnet mass as a percentage of the maximum reference value chosen for LA1=0.8×LP, with the corresponding scale being shown on the vertical axis on the left. The solid line curve B and triangular marks show the evolution of the force with current as a percentage of the maximum reference value chosen for LA1=1.5×LP, with the corresponding scale being shown on the vertical axis, on the right.

Such curves thus show that, in order to reach the best compromise between the total force produced with a current and the optimum force per magnet mass, the value of LA1 must be chosen in an interval from LP to 1.2×LP. A different selection, although possible, leads either to the non optimum utilization of the quantity of magnet, or an insufficient force for given global dimensions of the actuator. It should however be noted that the obtained effort without current is weakly modulated by the modification in the width LA1, and thus it is not a relevant dimensioning criterion.

Figure 8:
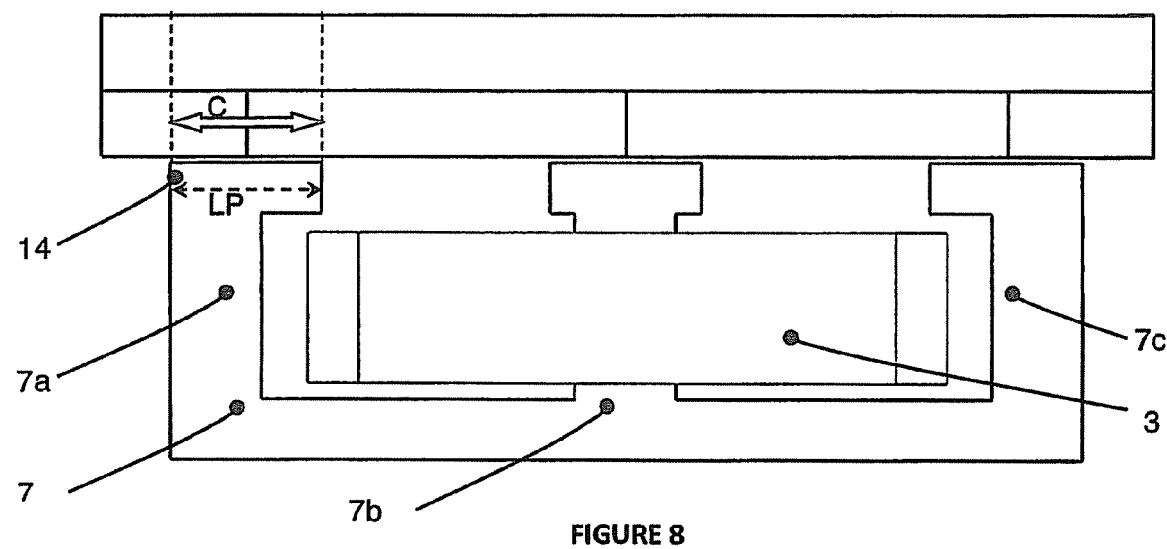
FIG. 8 is a front view of the actuator according to a fifth embodiment.

FIG. 8 illustrates a fifth possible embodiment of the actuator, wherein the stator 7 has three poles 7a, 7b, 7c, each of which has a head 14 and a body having different widths. More precisely, the body of such pole has a width less than LP, whereas each pole head 14, which may be made in one piece with the body of the pole or be attached thereon, has a width LP, as mentioned above. This alternative embodiment may advantageously be used more particularly to enable the installation of a wider coil 3 about the central pole 7b. In FIG. 8, the double horizontal solid arrow shows the maximum course of travel C that the mobile magnetic portion 8 can take above the stator unit 2.

The invention claimed is:

1. An electromagnetic actuator comprising at least a stator unit and a magnetic portion, with the stator unit having N poles having the width LP, and at least one coil surrounding one of the poles, wherein N≥3, and the magnetic portion being movable, relative to the stator unit, in a direction of relative movement and over a course of travel C, and including N+1 magnetized areas, the magnetizations of which are perpendicular to the direction of relative movement and in alternate directions, the magnetic portion further comprises a yoke contiguous to the magnetized areas and closing off the magnetic fluxes passing through the magnetized areas, the course of travel C of the magnetic portion being less than or equal to the width LP of each pole of the stator unit, and the thickness of the magnetized areas perpendicular to the direction of movement being less than the course of travel C of the magnetic portion.

2. An actuator according to claim 1, wherein N is equal to 3.

3. An actuator according to claim 1, wherein magnetized areas comprise at least two inner magnetized areas having, along the direction of movement, a length LA2 equal to the distance between the respective median planes of two consecutive stator poles.

4. An actuator according to claim 3, wherein the magnetized areas comprise at least two end magnetized areas having, along the direction of movement, a length LA1 between LP and 1.2×LP.

5. An actuator according to claim 1, wherein the magnetized areas are independent and contiguous magnets, fixed on the yoke.

6. An actuator according to claim 1, wherein the magnetized areas are formed by only one magnet, having areas magnetized alternately in opposite directions and transitions having a length less than 0.2×LP.

7. An actuator according to claim 1, further comprising another moveable magnetic portion, the two movable magnetic portions moving in opposite directions.

8. An actuator according to claim 1, further comprising two additional moveable magnetic portions, the three movable magnetic portions moving in alternate directions.

9. An actuator according to claim 1, wherein the at least one coil is single coil surrounding the central pole of the stator unit.

10. An actuator according to claim 1, wherein the stator unit is connected to each magnetic portion by suspension blades.

11. An actuator according to claim 1, wherein the stator unit is connected to each magnetic portion by resilient return elements so designed as to return such magnetic portion to the middle of the course of travel C thereof.

12. An actuator according to claim 1, wherein the coil is so designed as to be powered by an alternate current and to produce a vibratory movement of the magnetic portion relative to the stator unit.

13. An actuator according to claim 1, wherein surfaces of the stator poles are inscribed within a cylindrical enclosure and in that the magnetic portion(s) has/have a semi-tubular shape cooperating with a cylindrical enclosure.

14. An actuator according to claim 1, wherein the yoke has chamfers at the ends thereof, along the direction of movement.

15. An actuator according to claim 1, wherein each pole of the stator unit has a head with a width LP and a body with a width less than LP.

16. An actuator according to claim 1, further comprising a magnetic sensor and an electronic control circuit, with the magnetic sensor being positioned opposite the magnetic portion and so designed as to provide an output signal representative of the absolute position of such magnetic portion, and the electronic control circuit receiving the output signal from the magnetic sensor and being so designed as to control the position of the magnetic portion in a position determined by a set value powered to such electronic control circuit.

17. An actuator according to claim 1, further comprising an electric razor head provided with vibrating knives, each one of the knives being kinematically linked with the magnetic portion of the actuator.

* * * * *